Sept. 10, 1929.   C. A. SWENSON   1,727,452
EXPANSIVE BIT
Filed March 12, 1928
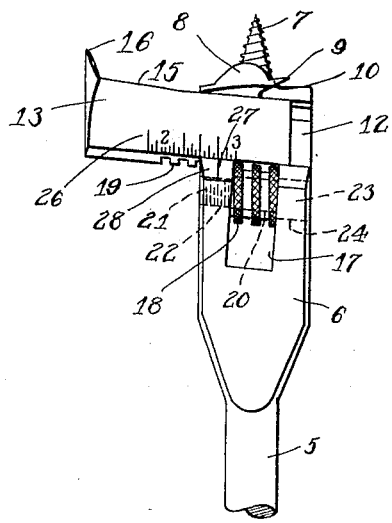
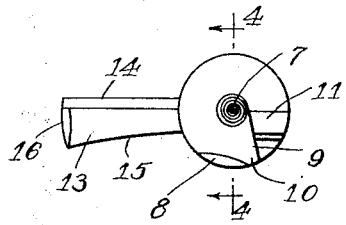
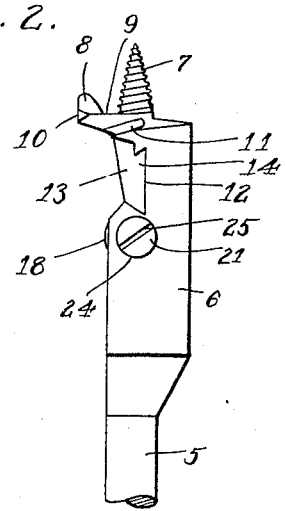
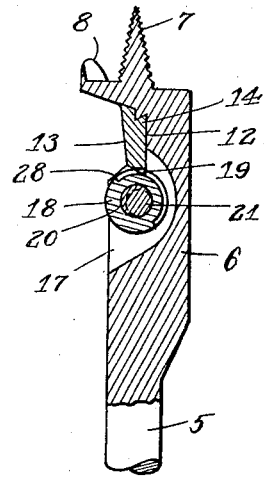
Inventor:
Carl A. Swenson
By Wilson & McCanna
Attys.

Patented Sept. 10, 1929.

1,727,452

UNITED STATES PATENT OFFICE.

CARL A. SWENSON, OF ROCKFORD, ILLINOIS, ASSIGNOR TO GREENLEE BROS. & CO., OF ROCKFORD, ILLINOIS, A CORPORATION OF ILLINOIS.

EXPANSIVE BIT.

Application filed March 12, 1928. Serial No. 260,827.

This invention relates to an improved expansive bit.

The principal object of my invention is to provide an expansive bit that can be quickly and accurately set to the desired size and also positively locked in its adjusted state in such a way that no amount of use will alter the adjustment thereof, the matter of locking and unlocking the bit requiring only the use of a screw driver, such as every carpenter, electrician, or other workman having use for a tool of this kind carries in his tool kit.

The bit made in accordance with my invention has the boring head thereof milled to provide a transversely inclined guideway for slidably receiving the shank of a blade extensible to different degrees according to the size of hole to be bored, the blade being preferably graduated on the shank thereof and the head having an index mark to cooperate therewith so as to facilitate accurately setting the bit to the desired size. Cooperating with the blade is an adjusting thumb screw which meshes with rack teeth in the edge of the shank of the blade, thus enabling quick and easy adjustment of the blade by hand. A very simple, yet highly effective, lock is provided by mounting the thumb screw on a rotatable eccentric, a quarter turn of which with a screw driver is arranged to bind the parts positively in adjusted condition so that the bit can be used without any danger of the same getting out of adjustment.

The invention is illustrated in the accompanying drawing wherein—

Figure 1 is an elevational view of my improved expansive bit, only a part of the shank being shown;

Fig. 2 is a view taken at right angles to Fig. 1;

Fig. 3 is an end view of the bit; and

Fig. 4 is a central longitudinal section taken on the line 4—4 of Fig. 3.

The same reference numerals are applied to corresponding parts throughout the views.

The expansive bit of the present invention, as appears in the drawing, comprises a shank 5 having an enlarged substantially semi-cylindrical head 6 provided on the end thereof, concentric with the shank and provided with the usual draw screw 7, sharpened circle-cutting spur 8, and sharpened chip-raising knife 9. The latter is suitably formed on what is usually termed an extension lip, shown at 10, whereby to permit sharpening the knife edge repeatedly. A throat is formed at 11 for the passage of the chips raised by the knife 9. The head 6 has a transverse dovetail-shaped groove 12 milled therein near the boring end thereof and on an incline, as is best evident in Fig. 1. An extensible blade 13 has a dovetail back 14 having a working fit in the groove 12 so that the latter serves as a guideway therefor. The blade 13 has an approximately radial cutting edge 15 and a circle-cutting spur 16 thereon, the former cooperating with the chip-raising knife 9 and the latter serving to cut circularly to the radius of the hole to be bored. Intersecting the groove 12 in the head 6 is a slot 17 milled into the flat side of the head, as best appears in Fig. 4. The slot 17, as appears in Fig. 1, is at right angles to the groove 12 and receives a thumb screw 18, the threads of which project into one side of the groove 12 sufficiently to mesh with rack teeth 19 cut in one edge of the dovetail back 14 of the blade 13. The periphery of the threads of the screw 18 is knurled to afford sufficient traction for thumb operation thereof. The screw, for the most part, is accommodated by the slot 17 so that there is no part left projecting enough to interfere with the easy operation of the bit. At the same time, the screw fills up most of the space in the slot so that there is little likelihood of chips clogging the same and interfering with the adjustment of the bit. The screw is normally free to turn on an eccentric bearing portion 20 provided intermediate the ends of a locking screw 21. The latter extends through the bore of the screw 18 crosswise of the slot 17 with the reduced threaded end threading in a hole 22 provided in the head 6 at one side of the slot and with the enlarged smooth cylindrical bearing end 23 thereof having a working fit in a larger hole 24 provided in the head at the other side of the slot, the latter end of the screw being provided with a screw driver slot 25, as shown. Obviously, in the assembling of the bit, the locking screw 21 is entered, reduced threaded end forward, through the hole 24 and through the bore of screw 18 to thread into hole 22, the intermediate bearing portion 20 being thereby entered into the screw 18 and bearing end 23 being thereby entered into hole 24.

In the adjustment of the bit the screw 21 is turned in a counter-clockwise direction, as the parts are viewed in Figs. 2 and 4, to bring the eccentric 20 to such a position that the thumb screw 18 can be turned fairly easily. Then the thumb screw is turned one way or the other to adjust the blade to a larger or smaller radius, the size of the hole which the bit will bore in its different settings being easily ascertained by reference to the scale 26 provided on the shank of the blade 13 in connection with which an index mark 27 is provided on the head 6 on the bevel face 28 defining one side of the groove 12. The screw and rack adjustment enables close setting of the bit to the desired size without any difficulty. When the proper adjustment has been made the blade 13 is arranged to be locked with its thumb screw adjustment by simply giving the screw 21 a quarter turn or so, enough to cause the eccentric 21 to bind the thumb screw 18 with the rack teeth on one edge of the shank of the blade 13 and to bind the other edge of the shank of the blade by its dovetail back 14 in the groove 12. It takes very little effort with a screw driver to make the blade 13 absolutely rigid and proof against loosening and getting out of adjustment in the subsequent use of the bit, and, of course, the matter of unlocking is equally as simple. No wrenches, pliers, or other tools are needed in connection with the bit; only a screw driver such as every carpenter, electrician, or other workman who would have use for a tool of this kind carries in his tool kit. The design and construction of the bit involves the use of practically a minimum number of parts, capable of production at fairly low cost and of such characteristics that the tool is rendered extremely serviceable and thoroughly reliable.

It is believed the foregoing description conveys a clear understanding of the tool of my invention and of the various advantages which it offers over tools heretofore provided for a similar purpose. While reference has been made to an expansive bit of a certain specific design and construction it should be evident that various changes might be made without seriously departing from the invention. For that reason all legitimate modifications and adaptions are intended to be covered in the appended claims.

I claim:

1. In an expansive bit, a head having a transverse guideway at the boring end thereof, an adjustable blade slidably received in said guideway, said blade being provided with teeth, said head having a recess intersecting said guideway on the toothed side of the blade, a thumb screw mounted for rotation in said recess having the threads thereof projecting into said guideway and meshing with the teeth on the blade, said screw having a portion thereof accessible from the side of the head for thumb operation thereof, a rotatable part having an eccentric portion providing a bearing for said screw, the turning of said part to a certain position being arranged to cause the binding of the screw with the blade due to said eccentric.

2. In an expansive bit, a head having a transverse guideway at the boring end thereof, an adjustable blade slidably received in said guideway, said blade being provided with teeth, said head having a recess intersecting said guideway on the toothed side of the blade, a thumb screw mounted for rotation in said recess having the threads thereof projecting into said guideway and meshing with the teeth on the blade, said screw having a portion thereof accessible from the side of the head for thumb operation thereof, and a locking screw passing through a central bore in said thumb screw and threadedly received in a hole provided in said head, the portion of said locking screw serving as a bearing for said thumb screw being eccentric with respect to the rest of the screw, whereby when the locking screw is turned to one position the thumb screw is free to turn to adjust the blade and when the locking screw is turned to another position the thumb screw is locked with the blade.

3. An expansive bit comprising a head having a transverse guideway at the boring end thereof, an adjustable blade slidably received in said guideway, said blade being provided with teeth, said head having a recess intersecting the guideway on the toothed side of the blade, a thumb screw mounted for rotation in said recess having the threads thereof projecting into the guideway for meshing engagement with the teeth on the blade, and also having a portion thereof accessible from the side of the head for thumb operation thereof, said head being provided with aligned holes therein at opposite sides of the recess, the one hole being threaded and one hole being larger in diameter than the other, and a one-piece rotatable locking screw having a reduced end adapted to fit the smaller hole and an enlarged end adapted to fit the larger hole, the one end being threaded to thread in the threaded hole to retain the screw in place, and the intermediate portion of said locking screw being eccentric with respect to the ends and being rotatably received in a central bore provided in the thumb screw, substantially as and for the purposes described.

In witness of the foregoing I affix my signature.

CARL A. SWENSON.